R. D. THOMSON.
CAR-COUPLING.

No. 175,525.

2 Sheets—Sheet 1.

Patented March 28, 1876.

Witnesses:

Inventor:

R. D. THOMSON.
CAR-COUPLING.
No. 175,525. Patented March 28, 1876.
2 Sheets—Sheet 2.

Fig. 11.
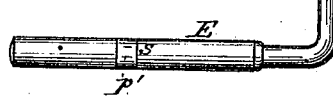

Witnesses:
Ulysses G. White
J. McP. Oelking
Inventor:
R. D. Thomson

UNITED STATES PATENT OFFICE.

ROBERT D. THOMSON, OF NORTH PLATTE, NEBRASKA, ASSIGNOR OF ONE-HALF HIS RIGHT TO HAMILTON R. OTTMAN AND JOHN E. EVANS, OF SAME PLACE.

IMPROVEMENT IN CAR-COUPLINGS.

Specification forming part of Letters Patent No. 175,525, dated March 28, 1876; application filed September 25, 1875.

*To all whom it may concern:*

Be it known that I, ROBERT D. THOMSON, of North Platte, in the county of Lincoln and State of Nebraska, have invented a new and useful Machine for the purpose of Coupling and Uncoupling Railway-Cars; and I do hereby declare that the following is a full, clear, and exact description of the parts, construction and operation of the same, reference being had to the annexed drawings, making a part of this specification, in which—

Figure 1:
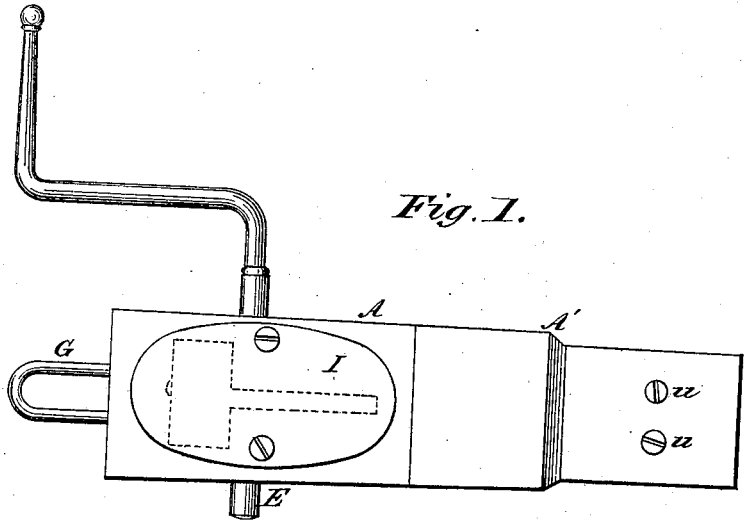
Figure 2:
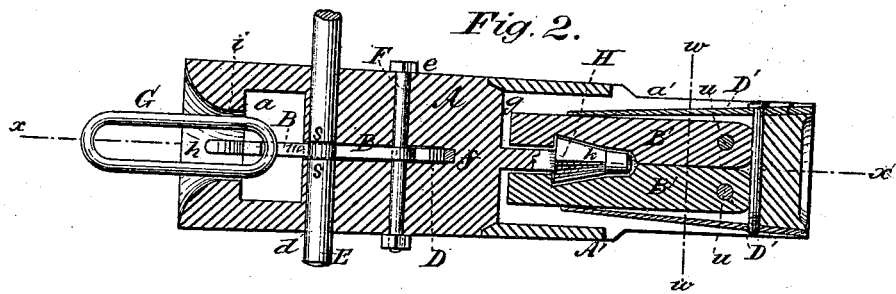
Figure 3:
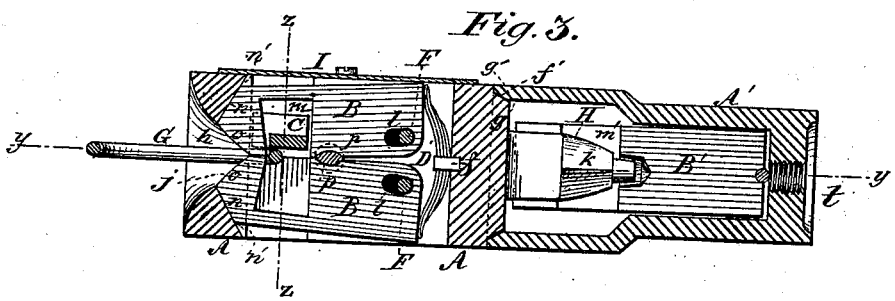
Figure 4:
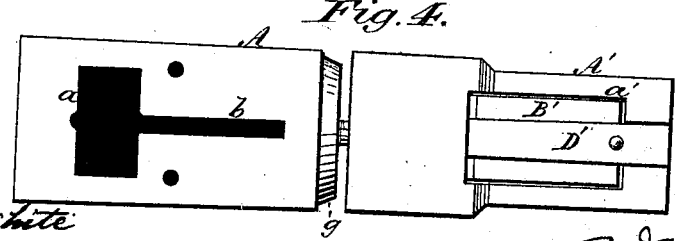
Figure 5:
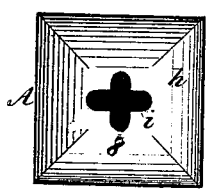
Figure 6:
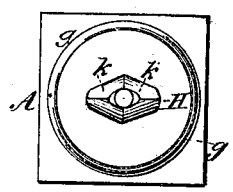
Figure 7:
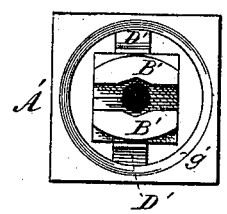
Figure 8:
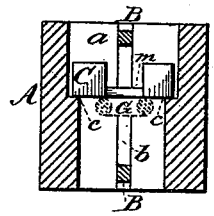
Figure 9:
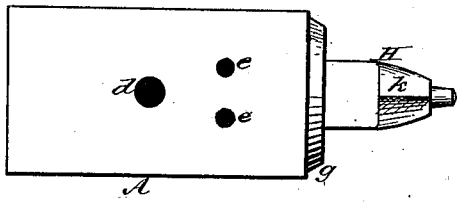
Figure 10:
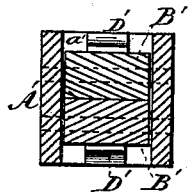
Figure 12:
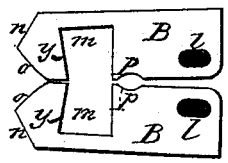
Figure 13:
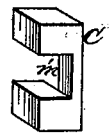

Figure 1 represents a top view of my complete coupling, including the automatic uncoupler. Fig. 2 is a central and horizontal section of the same, taken on the line $y\ y$ of Fig. 3. Fig. 3 is a central vertical section taken at the line $x\ x$ of Fig. 2. Fig. 4 represents at its left a top view of the self-coupler portion of my coupling, and at its right a side elevation of the self-uncoupling part of my complete coupling, the two being partly disengaged. Fig. 5 shows one face or end of the self-coupler. Fig. 6 shows the opposite end thereof. Fig. 7 shows the locking-face of the self-uncoupler. Fig. 8 is a cross-section on the line $z\ z$ of Fig. 3. Fig. 9 is a side view of the coupler (shown at the left of Fig. 4) as it appears when wholly disengaged. Fig. 10 is a cross-section on line $w\ w$ of Fig. 2. Figs. 11, 12, and 13 are views of details.

To enable others to construct and use my coupling, I proceed to describe its construction and operation.

The same letters designate like parts in the various figures of the drawings.

A is the frame of my self-coupler, and is in one piece. It has through it from top to bottom two slots, one, $a$, transverse, the other, $b$, longitudinal. Its entire face at one end tapers inwardly toward its center, as shown at $h$. At the center are two transverse slots, $i$ and $j$, communicating with the transverse slot $a$. Through the frame A are horizontal passages $d$ and $e\ e$. The face toward the middle of the coupling has a circular projection with beveled edge $g$, from the center of which projects an arrow-headed shaft, H. The coupling-jaws B B, Fig. 12, are provided with pivotal slots $l$, longer than their width, with locking-recesses $m\ m$, unlocking-recesses $p\ p$, and with teeth receding backward each way from their points. The rear faces of the teeth $y\ y$ also recede, making an arched or convex projection.

Fig. 13 shows a weight, having notches, one on its upper and one on its front side. To unite the parts described, drop the weight C into a slot, $a$, of frame A, where it rests loosely upon shoulders $c\ c$, Fig. 8, so as to play vertically in slot $a$. Then the coupling-jaws B B are inserted into the slot $b$, and are fastened by pivot-bolts F F (see Figs. 2 and 3) in bearings $e\ e$. The spring D, having a band or any projection backward from its center, is then inserted into slot $b$ back of the coupling-jaws B B, and pressed inward, its ends, bearing against the rears of the jaws, force the band into its slot $f$ in the frame A, where it rests without further securing.

The teeth of the jaws rest at their outer inclines $n$ against correspondingly-inclined grooves $n'$ in the frame A. The slots $a$ and $b$ are now covered by the plate I, removably attached by screws, as shown, or in any convenient manner. By this construction the slots $a$ and $b$ and their contents are protected. G is any ordinary coupling-link.

E, Fig. 11, is the uncoupling-bar, an ordinary rod provided at $p'$ with a portion shown to be elliptical in cross-sections, but which may be of any shape in cross-section, having unequal transverse diameters.

The operation of this portion of my invention is as follows: The link G is pressed against the mouth $h$ of the coupler, and passes into the slot $i$ and presses against the teeth of the pivotal jaws B B, whose faces $o$ are slotted to correspond with the inclination of the mouth $h$, and which lie in the slot $j$ of the mouth $h$. The link G, acting as a wedge, presses the teeth of the jaws apart. At the same time the outer inclines $n\ n$, operating against the correspondingly-inclined grooves $n'$ of the frame A, force the jaws B B backward and outward, which motions the elongated pivotal slots in the jaws permit. The link G, having passed between the teeth of the jaws into the locking-recesses $m\ m$, the force of the spring D, acting against the rear ends, in conjunction with the inclined grooves $n'$ of the frame A, forces the teeth of the jaws forward and inward to their original position. The link G is thus securely coupled.

The arched or angular line formed by the rear faces of the teeth $y\,y$ I prefer, as it strengthens the coupling, tending to bring the force exerted on the link to act more nearly on a line perpendicular to the inclined grooves $n'$. To keep the link in a horizontal position, and at the same time permit the free up and down motion of the link resulting from the motion of the cars, the weight C, made heavier than the outer portion of the link, rests loosely over the inner end of the link in the vertical slot $a$ on shoulders $c\,c$ in line horizontally with the upper side of the link when lying horizontally, and holds the link in this position for convenience in coupling.

If desirable, one or more springs may be inserted into slot $a$, and bearing against the weight on each side of the jaw B, and also against the under side of covering-plate I or other suitable upper bearing.

To uncouple the link the uncoupling-bar E, placed in position as shown in Fig. 2, by pushing it into its bearings $d$ in the frame A, and between the jaws B B, opening them, as has been described, for the link G. The recesses $p\,p$ of the jaws B B, of the same shape as the section $p'\,p'$ of the rod, close against the section, and the shoulders $s$ above and below the closed recess, supporting the rod in position for operation.

By turning the uncoupling-rod a quarter-turn in either direction, the longer axis of the center section is brought gradually in opposition to the shorter axis of its bearing-recesses $p\,p$, and opens the teeth of the jaws, as has been described, permitting the link G to pass out.

The uncoupling-rod may be extended toward the side of the car sufficiently to permit it to be operated without getting between the cars; or it may be furnished with attachments suitable for operating it from the platform, or from the roof of the cars.

The second part of my complete coupling is constructed as follows: A' is the frame in one piece, hollow, square in cross-section, having at one end a threaded opening, $e$, to receive the draw-stem for attachment to the car, and being open at the opposite end, where its interior is a hollow cylinder, and has a bevel, $g'$, to fit a correspondingly-beveled circular projection or boss, $g$, on the end of the frame A. A slot, $a'$, extends through A' from side to side thereof.

Into the open end of A' are slid locking-jaws B' B', which are fastened by pivot-bolts $u\,u$. Springs D' D' are then inserted into the slot $a'$, one on each side of frame A', and bearing severally against the outside of each of the locking-jaws B' B', where they are held and tightened in position by a screw-bolt and nut. The screw-bolt passes through the rear end of the slot $x'$ and through the springs D' D'. The rear ends of the springs rest in beds in the frame A'. By screwing the nut onto the rod the tension of both springs against the locking-jaws is increased. The slot $a'$ permits the springs to be tightened without removing any part of the coupling. The clamping-jaws B' B' have locking-recesses $m'\,m'$, one in each jaw, having a perpendicular and a sloping face conformed to the general shape of the arrow-head H attached to the shank on the end of the frame A. The teeth of the jaws (see Fig. 7) do not meet and retire at their centers, thus permitting the ready entrance of the arrow-head H. The arrow-head H is longer in vertical than in horizontal section, and tapers or curves on all sides toward its point. It has two plain faces, $k$, and vertical shoulders at its back on each longer side, but no shoulder on either shorter side.

By pressing the frame A against the frame A', which is attached to the car, the arrow-head H enters between the partially open mouth of the locking-jaws B' B', presses them apart, passes between them into the locking-recesses, when the springs D' D' drive the jaws together, and couples them into the head H. The bevels $g$ and $g'$ of the circular projection on the end of frame A and on the circular mouth of the frame A' meet and steady the connection of the frames. This steadiness is further accomplished by the pressure of the teeth of the locking-jaws, which are nearly flat, against the flat neck of the shank back of the arrow-head H.

The operation is as follows: The complete coupling, as shown in Fig. 1, is attached by a draw-stem to the rear end of a car, and a duplicate of the entire coupling is attached in like manner to the front end of a following car. The two cars are brought together when the link G couples, as has been described, at each of its ends into the set of jaws B B, and the two cars are coupled together. Whenever either of the cars tips sidewise at an angle of about forty-five degrees, or sufficiently to leave the track, one or the other of the arrow-heads H, either the one pointing toward the forward car or the one pointing toward the rear car, will automatically uncouple as follows: Whenever one car tips sidewise sufficiently to upset, it turns with itself to the same extent the frame A', which is rigidly attached to it. The frame A and its attached arrow-head H remaining comparatively stationary, the frame A' turns by its beveled bearing steadily on the beveled bearing on the end of frame A. At the same time the locking-jaws B' B', turning with frame A' until their flat teeth, formerly vertical, approach a horizontal position, when the arrow-head, remaining stationary in a vertical position, the teeth are pressed apart by the narrow sides of the arrow-head.

These sides having no locking shoulders, and the springs now being set back against the under side of the frame A', exert their force against the sloping narrow sides on the arrow-head to push it out from between them. In this they are assisted by the momentum of the tipping-car. It is obvious that if either of the frames A or A' remains comparatively stationary and the other turns, that the same automatic uncoupling will result. Should it be desirable, one of the automatic uncouplers may be locked, and the other thus be required to act alone. This may be accomplished by a pin set in holes made through the bevels of the joint of A and A', when these frames so pinned will be compelled to turn together. The flat shank and the arrow-head H may be cast of a piece with the frame A, as shown, or the shank and head of one piece, either wrought or cast, may be attached to the frame A, which, in that case, might be provided with a screw-threaded entrance for the shaft, as shown in Fig. 3 at $t$, or with any other suitable means or method of attachment. The means may be adapted also for attachment to the draw-stem of the car, and, whenever desired—as, for instance, on injury to the automatic uncoupler—it may be removed, and the self-coupler may be directly and immediately attached to the car. Or the self-coupler may at any other time be separately used.

By the construction of the locking-jaws, with inclines $n$ $n$, and of the coupler-frame, with inclines $n'$ $n'$, the clasp of the jaws is strengthened, and they are forced apart with greater difficulty by any power pulling on the coupling-link, as that power meets resistance in a line nearly perpendicular to the inclined faces. Further, the advantage resulting from the simple and automatic sustenance of the link in a horizontal position, so as to meet and promptly engage in coupling cars, is obvious. Furthermore, the whole coupling secures simplicity of construction and easiness of access to all parts for the replacement, repair, or readjustment of any part.

What I claim, and desire to secure by Letters Patent, is—

1. The coupling-jaws B B, having elongated pivotal slots $l$ $l$, sloping teeth, faces $n$ $n$ and $o$ $o$, and locking and unlocking recesses $m$ $m$ and $p$ $p$.

2. The frame A, having slots $a$ $b$, bell-mouth $h$, with slots $i$ $j$, grooves $n'$ $n'$, bearings $d$ $e$, and recess $f$, as and for the purpose described.

3. The combination of spring-actuated coupling-jaws, having elongated slots and teeth, with outer faces, which incline outward and backward, with a coupler-frame, having grooves inclining as the said teeth face, as and for the purpose set forth.

4. The combination of a coupler-frame, having slot $b$ and recess $f$, with coupling-jaws B B, and spring D, having a rearward projection, as and for the purpose set forth.

5. The combination of a frame having slot $i$ and a shouldered slot, $a$, with weight C and link G, as and for purpose set forth.

6. The combination of frame A, coupling-jaws B, spring D, and weight C, as and for the purpose set forth.

7. The combination of frame A, coupling-jaws B, spring D, weight C, and uncoupling-rod E, as and for the purpose set forth.

8. The combination of frame A', locking-jaws B' B', springs D' D', and a tension bolt and nut, as and for the purpose set forth.

9. The combination of an arrow-head, having a flat stem, and having locking-shoulders upon its longer and opposite sides only with mainly flat spring-jaws, having locking-shoulders on their longer sides only, as and for the purpose described.

10. The combination of a coupler-frame, having a circular and beveled boss, a flat shaft and flat arrow-head, H, having locking-shoulders on its longer sides only, with frame A', having a circular beveled mouth and flat locking-jaws B' B' having open flat teeth with central rabbets, and having locking-recesses shaped mainly as the arrow-head H and springs D' D', as and for the purpose set forth.

R. D. THOMSON.

Witnesses:
ULYSSES G. WHITE,
S. W. STOCKING.